(12) United States Patent
Bond et al.

(10) Patent No.: US 11,935,414 B1
(45) Date of Patent: Mar. 19, 2024

(54) IDENTIFICATION OF CONFUSING OBJECTS FOR COLOR DEFICIENT VISION

(71) Applicant: GM Global Technology Operations LLC, Detroit, MI (US)

(72) Inventors: Jacob Alan Bond, Rochester Hills, MI (US); Joseph F. Szczerba, Grand Blanc, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 73 days.

(21) Appl. No.: 17/822,897

(22) Filed: Aug. 29, 2022

(51) Int. Cl.
G08G 1/16 (2006.01)
G01S 13/931 (2020.01)
G01S 17/89 (2020.01)
G01S 17/931 (2020.01)
G06V 20/56 (2022.01)
G06V 20/58 (2022.01)

(52) U.S. Cl.
CPC ............ G08G 1/165 (2013.01); *G01S 13/931* (2013.01); *G01S 17/89* (2013.01); *G01S 17/931* (2020.01); *G06V 20/582* (2022.01); *G06V 20/584* (2022.01); *G06V 20/588* (2022.01)

(58) Field of Classification Search
CPC ....... G08G 1/165; G01S 13/931; G01S 17/89; G01S 17/931; G06V 20/582; G06V 20/584; G06V 20/588
See application file for complete search history.

(56) References Cited

U.S. PATENT DOCUMENTS

| | | | |
|---|---|---|---|
| 2005/0200500 A1* | 9/2005 | Wing | G08G 1/09623 348/148 |
| 2006/0203102 A1* | 9/2006 | Yang | H04N 9/73 348/E9.051 |
| 2011/0229023 A1* | 9/2011 | Jones | G06T 11/001 382/162 |
| 2016/0070965 A1* | 3/2016 | Nelson | G06V 20/58 382/104 |
| 2022/0327928 A1* | 10/2022 | Wu | G06V 10/56 |

\* cited by examiner

*Primary Examiner* — Mohamed Barakat
(74) *Attorney, Agent, or Firm* — Vivacqua Crane, PLLC (57) ABSTRACT

A system for determining when additional information is needed by a passenger with color deficient vision within a vehicle includes a plurality of perception sensors within the vehicle adapted to collect data related to a physical identity of a primary object and to communicate the data related to the physical identity of the primary object, via a communication bus, to a data processor within the vehicle, the data processor adapted to determine that the physical identity of the primary object may be unclear to a passenger with color deficient vision based on the data related to the physical identity of the primary object, and that assistance should be provided to the passenger with color deficient vision to aid the passenger with color deficient vision in identifying the primary object.

16 Claims, 3 Drawing Sheets

IDENTIFICATION OF CONFUSING OBJECTS FOR COLOR DEFICIENT VISION

INTRODUCTION

The present disclosure relates to a system for determining when a passenger within a vehicle requires additional information to help identify an object in proximity to the vehicle. More specifically, passengers within a vehicle that have color deficient vision, or are "color-blind", may have difficulty recognizing objects in proximity to the vehicle. This is a significant problem with items that are specifically identifiable by their color. Traffic lights are color specific, stop signs are red, yield signs are yellow, curbs are painted different colors designating various restrictions, such as no parking zones, bus loading areas, etc.

Modern vehicles are equipped with systems that are capable of providing additional information to a passenger on the physical identity of an object detected near a vehicle. Vehicles "see" objects nearby and artificial intelligence software and neural networks allow systems within the vehicle to determine what an object is. Such systems may also access information from other vehicles and remote servers to collect information on the physical identify of objects detected near the vehicle.

For a passenger with color deficient vision, often, additional information may be needed to identify an object. For example, if a passenger with color deficient vision sees a three-light traffic light, which has a green light, a yellow light, and a red light, the passenger with color deficient vision may still be able to easily identify what signal the traffic light is presenting, as the position of the red, green and yellow lights are always consistent. Further, if a passenger with color deficient vision sees a stop sign, the passenger with color deficient vision may still be able to easily identify the stop sign based on the size and shape of the sign. However, if a passenger with color deficient vision sees a single-light traffic light, which has only one light, the passenger with color deficient vision may have difficulty knowing what the signal is because the they cannot distinguish if the light is red, which means stop, or yellow, which means proceed with caution. Likewise, if a passenger with color deficient vision sees a stop sign that is partially obscured with tree branches and leaves, without being able to distinguish between the red color of the sign, and the green and brown colors of the branches and leaves, the size and shape of the sign may be difficult to ascertain, and the passenger with color deficient vision may not be able to easily identify the stop sign.

Thus, in some instances, a passenger with color deficient vision may need additional assistance in identifying an object, and, in other instances, a passenger with color deficient vision may not need additional assistance. While current systems have the capability to provide additional information regarding objects within proximity of a vehicle, a system that always provides additional information for all detected objects would overload a passenger with color deficient vision with too much information, when such additional information is not always required.

Thus, while current systems and method of providing additional information regarding objects in proximity to a vehicle achieve their intended purpose, there is a need for a new and improved system and method for determining when additional information is needed for a passenger with color deficient vision to aid the passenger with color deficient vision in identifying an object in proximity to a vehicle.

SUMMARY

According to several aspects of the present disclosure, a method of determining when additional information is needed by a passenger with color deficient vision within a vehicle includes collecting, with a plurality of perception sensors within the vehicle, data related to a physical identity of a primary object and communicating data related to the physical identity of the primary object, via a communication bus, to a data processor within the vehicle, determining, with the data processor, that the physical identity of the primary object may be unclear to a passenger with color deficient vision based on the data related to the physical identity of the primary object, and determining, with the data processor, that assistance should be provided to the passenger with color deficient vision to aid the passenger with color deficient vision in identifying the primary object.

According to another aspect, the method further includes collecting, with the plurality of perception sensors within the vehicle, data related to secondary objects in proximity to the primary object and communicating data related to the secondary objects, via the communication bus, to the data processor within the vehicle, determining, with the data processor, that the physical identity of the primary object may be unclear to a passenger with color deficient vision based on the location of the secondary objects relative to the primary object, and determining, with the data processor, that assistance should be provided to the passenger with color deficient vision to aid the passenger with color deficient vision in identifying the primary object.

According to another aspect, the method further includes collecting, with an infotainment system adapted to allow a passenger with color deficient vision within the vehicle to input feedback that a primary object is difficult to identify, feedback from the passenger with color deficient vision within the vehicle that a primary object is difficult to identify, communicating the feedback from the passenger with color deficient vision to the data processor via the communication bus, determining, with the data processor, that the physical identity of the primary object may be unclear to the passenger with color deficient vision based on the feedback from the passenger with color deficient vision within the vehicle, and determining, with the data processor, that assistance should be provided to the passenger with color deficient vision to aid the passenger with color deficient vision in identifying the primary object.

According to another aspect, the method further includes accessing, with the data processor, via a wireless communication network, a remotely located database having historical data of prior feedback from other passengers with color deficient vision in other vehicles that the primary object is difficult to identify, collecting, with the data processor, via the wireless communication network, historical data, from the remotely located database, of prior feedback from other passengers with color deficient vision in other vehicles that the primary object is difficult to identify, determining, with the data processor, that the physical identity of the primary object may be unclear to the passenger with color deficient vision based on the historical data, and determining, with the data processor, that assistance should be provided to the passenger with color deficient vision to aid the passenger with color deficient vision in identifying the primary object.

According to another aspect, the method further includes accessing, with the data processor, historical data stored within the data processor of prior feedback by the passenger with color deficient vision within the vehicle that the primary object is difficult to identify, determining, with the data processor, that the physical identity of the primary object may be unclear to the passenger with color deficient vision based on the prior feedback by the passenger with color deficient vision that the primary object is difficult to identify, and determining, with the data processor, that assistance should be provided to the passenger with color deficient vision to aid the passenger with color deficient vision in identifying the primary object.

According to another aspect, the method further includes accessing, with the data processor, historical data stored within the data processor of prior feedback by the passenger with color deficient vision within the vehicle that the primary object is not difficult to identify, determining, with the data processor, that the physical identity of the primary object is identifiable by the passenger with color deficient vision based on the prior feedback by the passenger with color deficient vision that the primary object is not difficult to identify, and determining, with the data processor, that assistance should not be provided to the passenger with color deficient vision to aid the passenger with color deficient vision in identifying the primary object.

According to another aspect, the method further includes accessing, with the data processor, via the wireless communication network, a remotely located database having historical data of prior feedback from other passengers in other vehicles of the physical identity of the primary object, collecting, with the data processor, via the wireless communication network, historical data, from the remotely located database, of the prior feedback from other passengers in other vehicles of the physical identity of the primary object, and when the data processor has determined that the physical identity of the primary object may be unclear to the passenger with color deficient vision, determining, with the data processor, that assistance should be provided to the passenger with color deficient vision based on the historical data of previous indications of the physical identity of the primary object to aid the passenger with color deficient vision in identifying the primary object.

According to another aspect, the method further includes accessing, with the data processor, historical data stored within the data processor of prior feedback from the passenger with color deficient vision within the vehicle of the physical identity of the primary object, and when the data processor has determined that the physical identity of the primary object may be unclear to the passenger with color deficient vision, determining, with the data processor, that assistance should be provided to the passenger with color deficient vision based on the historical data of the prior feedback from the passenger with color deficient vision of the physical identity of the primary object.

According to several aspects of the present disclosure, a system for determining when additional information is needed by a passenger with color deficient vision within a vehicle includes a plurality of perception sensors within the vehicle adapted to collect data related to a physical identity of a primary object and to communicate the data related to the physical identity of the primary object, via a communication bus, to a data processor within the vehicle, the data processor adapted to determine that the physical identity of the primary object may be unclear to a passenger with color deficient vision based on the data related to the physical identity of the primary object, and that assistance should be provided to the passenger with color deficient vision to aid the passenger with color deficient vision in identifying the primary object.

According to another aspect, the plurality of perception sensors within the vehicle are further adapted to collect data related to secondary objects in proximity to the primary object and to communicate the data related to the secondary objects, via the communication bus, to the data processor within the vehicle, the data processor adapted to determine that the physical identity of the primary object may be unclear to a passenger with color deficient vision based on the data related to the secondary objects, and that assistance should be provided to the passenger with color deficient vision to aid the passenger with color deficient vision in identifying the primary object.

According to another aspect, the system further includes an infotainment system adapted to allow a passenger with color deficient vision within the vehicle to input feedback that a primary object is difficult to identify and to communicate the feedback from the passenger with color deficient vision that a primary object is difficult to identify to the data processor via the communication bus, the data processor adapted to determine that the physical identity of the primary object may be unclear to the passenger with color deficient vision based on the feedback from the passenger with color deficient vision within the vehicle that the primary object is difficult to identify, and that assistance should be provided to the passenger with color deficient vision to aid the passenger with color deficient vision in identifying the primary object.

According to another aspect, the system further includes a wireless communication network adapted to allow communication between the data processor and a remotely located database, the remotely located database having historical data of prior feedback from other passengers with color deficient vision in other vehicles that the primary object is difficult to identify stored thereon, the data processor adapted to collect the historical data of prior feedback from other passengers with color deficient vision in other vehicles that the primary object is difficult to identify from the remotely located database, determine that the physical identity of the primary object may be unclear to the passenger with color deficient vision based on the historical data of prior feedback from other passengers with color deficient vision in other vehicles that the primary object is difficult to identify, and that assistance should be provided to the passenger with color deficient vision to aid the passenger with color deficient vision in identifying the primary object.

According to another aspect, the data processor further includes historical data of prior feedback from the passenger with color deficient vision within the vehicle that the primary object is difficult to identify stored thereon, the data processor adapted to determine that the physical identity of the primary object may be unclear to the passenger with color deficient vision based on the historical data of prior feedback from the passenger with color deficient vision that the primary object is difficult to identify, and that assistance should be provided to the passenger with color deficient vision to aid the passenger with color deficient vision in identifying the primary object.

According to another aspect, the data processor further includes historical data of prior feedback from the passenger with color deficient vision within the vehicle that the primary object is not difficult to identify stored thereon, the data processor adapted to determine that the physical identity of the primary object is identifiable to the passenger with color deficient vision based on the historical data of prior feedback from the passenger with color deficient vision that the primary object is not difficult to identify, and that assistance should not be provided to the passenger with color deficient vision to aid the passenger with color deficient vision in identifying the primary object.

According to another aspect, the remotely located database further includes historical data of prior feedback from other passengers in other vehicles of the physical identity of the primary object stored thereon, the data processor adapted to collect the historical data of prior feedback from other passengers in other vehicles of the physical identity of the primary object from the remotely located database, and to determine that assistance should be provided to the passenger with color deficient vision based on the historical data of prior feedback from other passengers in other vehicles of the physical identity of the primary object when the data processor determines that the physical identity of the primary object may be unclear to the passenger with color deficient vision.

According to another aspect, the data processor further includes historical data of prior feedback from the passenger with color deficient vision within the vehicle of the physical identity of the primary object stored thereon, the data processor adapted to determine that assistance should be provided to the passenger with color deficient vision based on the historical data of prior feedback from the passenger with color deficient vision within the vehicle of the physical identity of the primary object when the data processor determines that the physical identity of the primary object may be unclear to the passenger with color deficient vision.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 1:
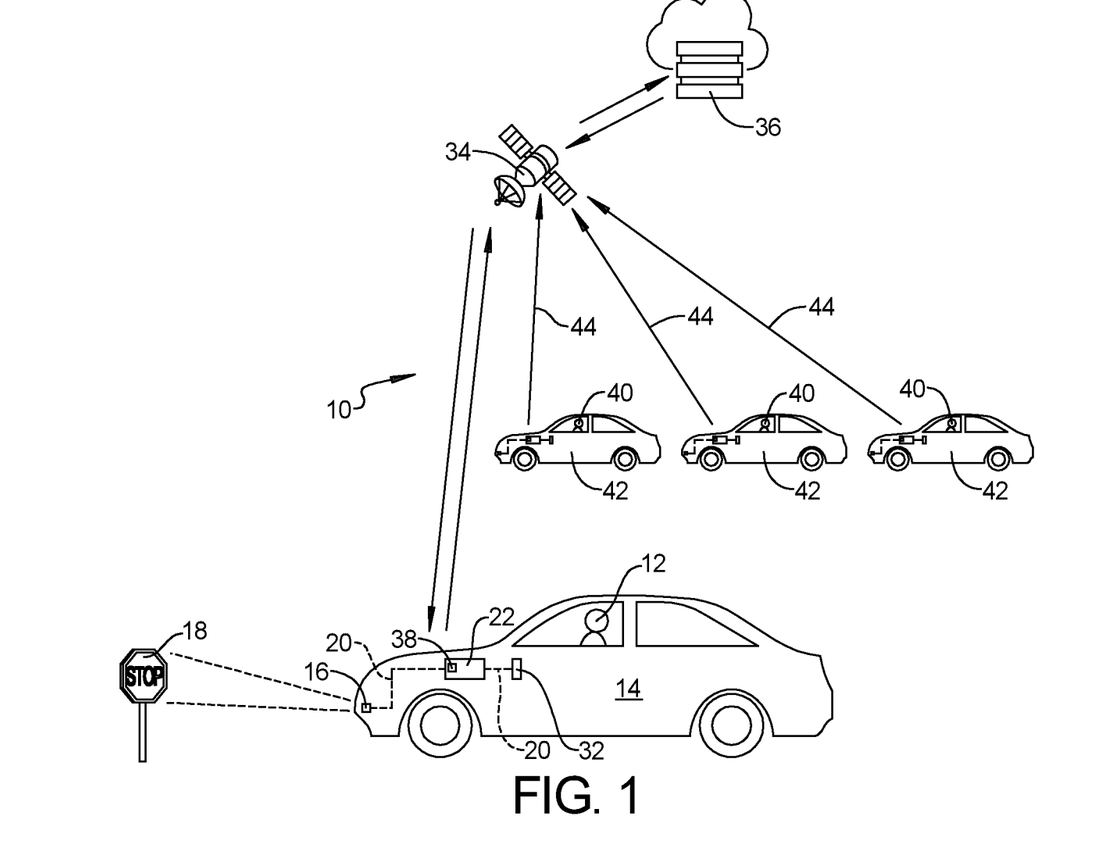
FIG. 1 is a schematic view of a system according to an exemplary embodiment.

Referring to FIG. 1, a system 10 for determining when additional information is needed by a passenger with color deficient vision 12 within a vehicle 14, includes a plurality of perception sensors 16 within the vehicle 14 adapted to collect data related to a physical identity of a primary object 18. The plurality of perception sensors 16 communicate the data related to the physical identity of the primary object 18, via a communication bus 20, to a data processor 22 within the vehicle 14.

The plurality of perception sensors 16 is made up of different sensor types including, but not limited to, cameras, radars, and lidars. Video cameras and sensors see and interpret objects in the road just like human drivers do with theft eyes. Typically, video cameras are positioned around the vehicle at every angle to maintain a 360 degree view around the vehicle and providing a broader picture of the traffic conditions around them. Video cameras display highly detailed and realistic images, and automatically detect objects, such as other cars, pedestrians, cyclists, traffic signs and signals, road markings, bridges, and guardrails, classify them, and determine the distances between them and the vehicle.

Radar (Radio Detection and Ranging) sensors send out radio waves that detect objects and gauge theft distance and speed in relation to the vehicle in real time. Both short range and long range radar sensors may be included in the plurality of perception sensors. Lidar (Light Detection and Ranging) sensors work similar to radar sensors, with the only difference being that they use lasers instead of radio waves. Apart from measuring the distances to various objects on the road, lidar allows creating 3D images of the detected objects and mapping the surroundings. Moreover, lidar can be configured to create a full 360-degree map around the vehicle rather than relying on a narrow field of view.

The data processor 22 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The data processor 22 is adapted to determine that the physical identity of the primary object 18 may be unclear to the passenger with color deficient vision 12 based on the data related to the physical identity of the primary object 18, and that assistance should be provided to the passenger with color deficient vision 12 to aid the passenger with color deficient vision 12 in identifying the primary object 18.

Figure 2:
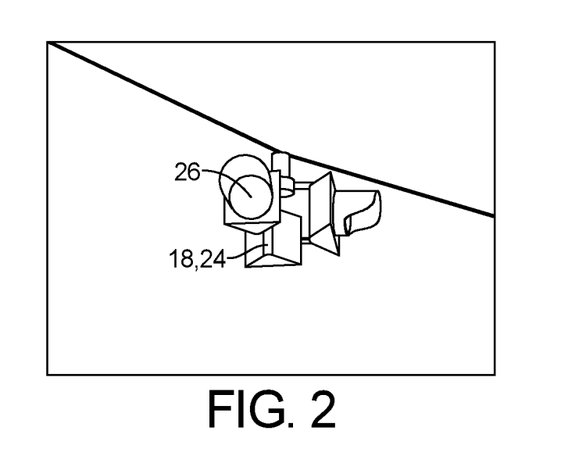
FIG. 2 is a perspective view of a single-light traffic signal.

Referring to FIG. 2, if the plurality of perception sensors 16 detect the presence of a single-light traffic signal 24, the data processor 22 is programed to understand that the meaning of a single-light traffic signal 24 depends entirely on the color of the light 26 therein. A passenger with color deficient vision 12 will not be able to interpret a single-light traffic signal 24, and thus, the data processor 22 will determine that the single-light traffic signal 24 may be unclear to the passenger with color deficient vision 12, and that additional assistance for the passenger with color deficient vision 12 is necessary.

As discussed above, modern vehicles have many systems adapted to provide information to passengers relative to objects detected in proximity to the vehicle. Thus, when the system 10 of the present disclosure determines that additional assistance is necessary, the data processor 22 will communicate with one or more such systems that will provide additional information to the passenger with color deficient vision 12 via audible messages, textual information displayed on an infotainment system or through a head-up-display system, or other known techniques.

In an exemplary embodiment, the plurality of perception sensors 16 within the vehicle 14 are further adapted to collect data related to secondary objects 28 in proximity to the primary object 18 and to communicate the data related to the secondary objects 28, via the communication bus 20, to the data processor 22 within the vehicle 14. The data processor 22 is adapted to determine that the physical identity of the primary object 18 may be unclear to a passenger with color deficient vision 12 based on the data related to the secondary objects 28, and that assistance should be provided to the passenger with color deficient vision 12 to aid the passenger with color deficient vision 12 in identifying the primary object 18.

Figure 3A:
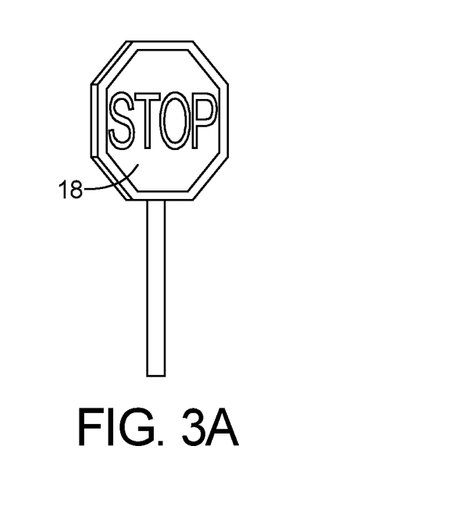
FIG. 3A is a perspective view of a primary object that is clear of secondary objects.

Referring to FIG. 3A, when the data processor 22 receives data from the plurality of perception sensors 16 related to the primary object 18, here a stop sign, shown in FIG. 3A, the data processor 22 recognizes that the size and shape of the stop sign are clearly discernible, and thus, will determine that the passenger with color deficient vision 12 within the vehicle 14 is likely to be able to identify the stop sign by the shape and size of the stop sign.

Figure 3B:
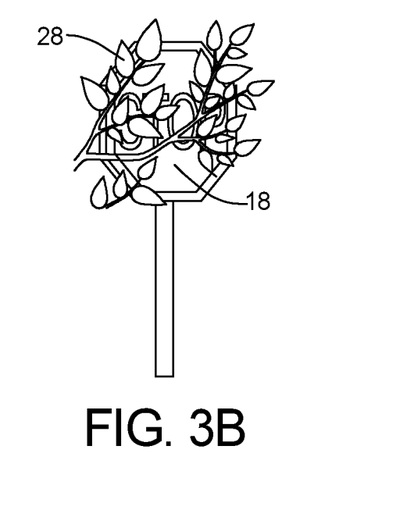
FIG. 3B is a perspective view of a primary object that is occluded by tree branches and leaves.

Referring to FIG. 3B, when the data processor 22 receives data from the plurality of perception sensors 18 related to the primary object 18, here a stop sign and secondary objects 28, here branches and leaves of a nearby tree, the data processor 22 recognizes that the location of the tree branches and leaves, in front of the sign, is likely to prevent the passenger with color deficient vision 12 from identifying the stop sign. The passenger with color deficient vision 12 will not be able to distinguish between the red color of the stop sign and the green and brown colors of the tree branches and leaves, and the tree branches and leaves prevent the passenger with color deficient vision 12 from being able to discern the exact shape and size of the stop sign. Thus, the data processor 22 will determine that additional information must be provided to ensure the passenger with color deficient vision 12 can quickly and accurately identify the physical identity of the primary object 18 as a stop sign.

Figure 4:
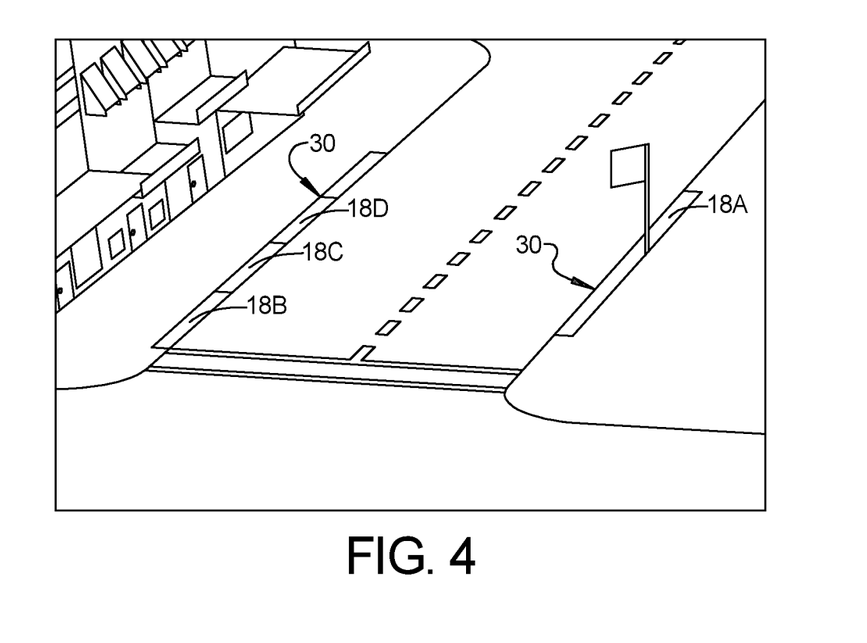
FIG. 4 is a perspective view of a roadway with a plurality of painted curb sections.

Referring to FIG. 4, in another example, the data processor 22 receives data related to multiple primary objects 18A, 18B, 18C, 18D. As shown, each of the multiple primary objects 18A, 18B, 18C, 18D is a section of curb 30 that is painted a different color depending on specific usage restrictions for that section of curb 30. A first section 18A of the curb 30 may be painted red, designating a bus loading/unloading zone, and thus a no-parking zone. A second section 183 of the curb 30, nearest to the intersection, may be painted red designating a no-parking zone near the intersection. A third section 18C of the curb 30 may be painted yellow, indicating parking for a limited time, or only for loading/unloading passenger or packages, and a fourth section 18D of the curb 30 may be painted green, indicating that it is ok to park in front of that section of curb 30.

The data processor 22 recognizes that the passenger with color deficient vision 12 will not be able to distinguish between the colors of the first, second, third and fourth sections 18A, 183, 18C, 18D of curb 30, and thus, will determine that the passenger with color deficient vision 12 within the vehicle 14 will be unable to interpret the corresponding parking restrictions for each of the first, second, third and fourth sections 18A, 183, 18C, 18D of curb 30, and will determine that additional information is necessary for the passenger with color deficient vision 12.

Referring again to FIG. 1, in an exemplary embodiment, the system 10 further includes an infotainment system 32 adapted to allow the passenger with color deficient vision 12 within the vehicle 14 to input feedback and to communicate the feedback from the passenger with color deficient vision 12 to the data processor 22 via the communication bus 20. The infotainment system 32 may be mounted within the vehicle, or may be an application or program which allows a user to input feedback and communicate the feedback to the data processor 22 via a mobile device. The data processor 22 is adapted to receive feedback provided by the passenger with color deficient vision 12 and to take immediate action when appropriate. Further, the data processor 22 is adapted to store feedback from the passenger with color deficient vision 12 thereon, creating a database of historical data or passenger preferences for future reference.

In an exemplary embodiment, the data processor 22 is adapted to determine that the physical identity of the primary object 18 may be unclear to the passenger with color deficient vision 12 based on current feedback from the passenger with color deficient vision 12 within the vehicle 14 that the primary object 18 is difficult to identify, and that assistance should be provided to the passenger with color deficient vision 12 to aid the passenger with color deficient vision 12 in identifying the primary object 18. For example, if the data processor 22 tags the primary object 18 as potentially difficult to identify by the passenger with color deficient vision 12, the data processor 22 prompts the passenger with color deficient vision 12, via the infotainment system 32. If the passenger with color deficient vision 12 wants to receive additional information relative to the physical identity of the primary object 18, the passenger with color deficient vision 12 can elect to receive additional information, by indicating that the primary object 18 is difficult to identify, via the infotainment system 32. In another example, the passenger 12 may elect to receive additional information, by indicating that the primary object 18 is difficult to identify, via the infotainment system 32, without being prompted.

In another exemplary embodiment, the data processor 22 is adapted to determine that the physical identity of the primary object 18 may be unclear to the passenger with color deficient vision 12 based on prior feedback, stored within the data processor 22, from the passenger with color deficient vision 12 that the primary object 18 is difficult to identify, and that assistance should be provided to the passenger with color deficient vision 12 to aid the passenger with color deficient vision 12 in identifying the primary object 18. When the passenger with color deficient vision 12 actively elects, via the infotainment system 32, that the primary object 18 is difficult to identify, the data processor 22 stores such election for future reference. When the data processor 22 receives data from the plurality of perception sensors 16 regarding a primary object 18 for which the passenger with color deficient vision 12 has previously indicated is difficult to identify, the data processor 22 automatically determines that it is necessary to provide additional information to the passenger with color deficient vision 12. In addition, the data processor 22 may determine, after gathering data about the primary object, that the primary object is very similar to or the same as other objects for which the data processor 22 has stored previous feedback from the passenger 12. For example, referring again to FIG. 2, if the plurality of perception sensors 16 detect the presence of a single-light traffic signal 24, and the data processor 22 includes stored data of multiple instances where the passenger 12 has indicated that other single-light traffic signals, that look similar or the same as the primary object 18 are difficult to identify, the data processor 22 will determine that the single-light traffic signal 24 may be unclear to the passenger with color deficient vision 12, and that additional assistance for the passenger with color deficient vision 12 is necessary.

In still another exemplary embodiment, the data processor 22 is adapted to determine that the physical identity of the primary object 18 may be unclear to the passenger with color deficient vision 12 based on current feedback from the passenger with color deficient vision 12 within the vehicle 14 that the primary object 18 is not difficult to identify, and that assistance should not be provided to the passenger with color deficient vision 12 to aid the passenger with color deficient vision 12 in identifying the primary object 18. For example, if the data processor 22 tags the primary object 18 as potentially difficult to identify by the passenger with color deficient vision 12, the data processor 22 prompts the passenger with color deficient vision 12, via the infotainment system 32. If the passenger with color deficient vision 12 does not want to receive additional information relative to the physical identity of the primary object 18, the passenger with color deficient vision 12 can elect to not receive additional information, by indicating that the primary object 18 is not difficult to identify, via the infotainment system 32. In another example, the passenger 12 may elect not to receive additional information, by indicating that the primary object 18 is not difficult to identify, via the infotainment system 32, without being prompted.

In another exemplary embodiment, the data processor 22 is adapted to determine that the physical identity of the primary object 18 may be identifiable by the passenger with color deficient vision 12 based on prior feedback, stored within the data processor 22, from the passenger with color deficient vision 12 that the primary object 18 is not difficult to identify, and that assistance should not be provided to the passenger with color deficient vision 12 to aid the passenger with color deficient vision 12 in identifying the primary object 18. When the passenger with color deficient vision 12 actively elects, via the infotainment system 32, that the primary object 18 is not difficult to identify, the data processor 22 stores such election for future reference. When the data processor 22 receives data from the plurality of perception sensors 16 regarding a primary object 18 for which the passenger with color deficient vision 12 has previously indicated is identifiable, the data processor 22 automatically determines that it is not necessary to provide additional information to the passenger with color deficient vision 12.

The infotainment system 32 is further adapted to avow the passenger with color deficient vision 12 to identify a primary object 18. For example, the passenger with color deficient vision 12 may know that the vehicle 14 is approaching a stop sign, even though the stop sign is partially occluded by tree branches and leaves. The passenger with color deficient vision 12 may provide feedback to the data processor 22, via the infotainment system 32, of the physical identity of the primary object 18, for this example, that the primary object 18 is a stop sign. The data processor 22 will store this information as historical data for future reference.

In another exemplary embodiment, when the data processor 22 determines that the physical identity of the primary object 18 may be unclear to the passenger with color deficient vision 12, and the historical data stored within the data processor 22 includes feedback by the passenger with color deficient vision 12 of the physical identify of the primary object 18, the data processor 22 is adapted to determine that assistance should be provided to the passenger with color deficient vision 12 based on the historical data of prior feedback from the passenger with color deficient vision 12 within the vehicle 14 of the physical identity of the primary object 18.

Referring again to FIG. 1, in an exemplary embodiment, the system 10 further includes a wireless communication network 34 adapted to allow communication between the data processor 22 and a remotely located database 36. The data processor 22 includes a wireless communication module 38 that is adapted to communicate wirelessly, via the wireless communication network 34, over wireless communication channels such as a WLAN, 4G/LTE or 5G network, or the like. Such remotely located database 36 can be communicated with directly via the internet, or may be cloud-based databases. The remotely located database 36 includes historical data of prior feedback from other passengers with color deficient vision 40 in other vehicles 42 stored thereon. As shown, other vehicles 42 equipped with systems in accordance with the present disclosure, continuously send data related to physical identity of primary objects 18 and feedback by other passengers with color deficient vision 40, as indicated by arrows 44. Such date is stored as historical data on the remotely located database 36. The data processor 22 is adapted to collect the historical data of prior feedback from other passengers with color deficient vision 40 in other vehicles 42.

In an exemplary embodiment, the data processor 22 is adapted to determine that the physical identity of the primary object 18 may be unclear to the passenger with color deficient vision 12 based on historical data of prior feedback from other passengers with color deficient vision 40 in other vehicles 42 that the primary object 18 is difficult to identify, and that assistance should be provided to the passenger with color deficient vision 12 to aid the passenger with color deficient vision 12 in identifying the primary object 18. When the vehicle 14 approaches a primary object 18, the data processor 22 accesses the remotely located database 36, via the wireless communication network 34. If the historical data stored on the remotely located database 36 includes prior feedback from other passengers 40 in other vehicles 42 that the primary object 18 is difficult to identify, the data processor 22 will automatically determine that the primary object 18 is difficult to identify and that assistance should be provided to the passenger with color deficient vision 12. In addition, the data processor 22 may determine, after gathering data about the primary object 18, that the primary object 18 is very similar to or the same as other objects for which prior feedback from other passengers 40 in other vehicles 42 has been stored on a remote database 36. For example, referring again to FIG. 2, if the plurality of perception sensors 16 detect the presence of a single-light traffic signal 24, and the data processor 22 accesses a remotely located database 36 that includes stored data of multiple instances where other passengers 40 in other vehicles 42 have indicated that other single-light traffic signals, that look similar or the same as the primary object 18 are difficult to identify, the data processor 22 will determine that the single-light traffic signal 24 may be unclear to the passenger with color deficient vision 12, and that additional assistance for the passenger with color deficient vision 12 is necessary.

In another embodiment, the data processor 22 is adapted to determine that assistance should be provided to the passenger with color deficient vision 12 based on historical data of prior feedback from other passengers 40 in other vehicles 42 of the physical identity of the primary object 18 when the data processor 22 determines that the physical identity of the primary object 18 may be unclear to the passenger with color deficient vision 12. When the vehicle 14 approaches a primary object 18, and the data processor 22 determines that the physical identity of the primary object 18 may be unclear to the passenger with color deficient vision 12, the data processor 22 accesses the remotely located database 36, via the wireless communication network 34. If the historical data stored on the remotely located database 36 includes prior feedback from other passengers 40 in other vehicles 42 of the physical identity of the primary object 18, the data processor 22 will automatically determine that assistance should be provided to the passenger with color deficient vision 12. For example, if multiple prior other passengers 40 in other vehicles 42 provided feedback relative to the physical identity of a primary object 18, such as indicating the primary object 18 is a yield sign, the data processor 22 will use such historical data to determine that assistance should be provided to the passenger with color deficient vision 12 that the primary object 18 is a yield sign.

Figure 5:
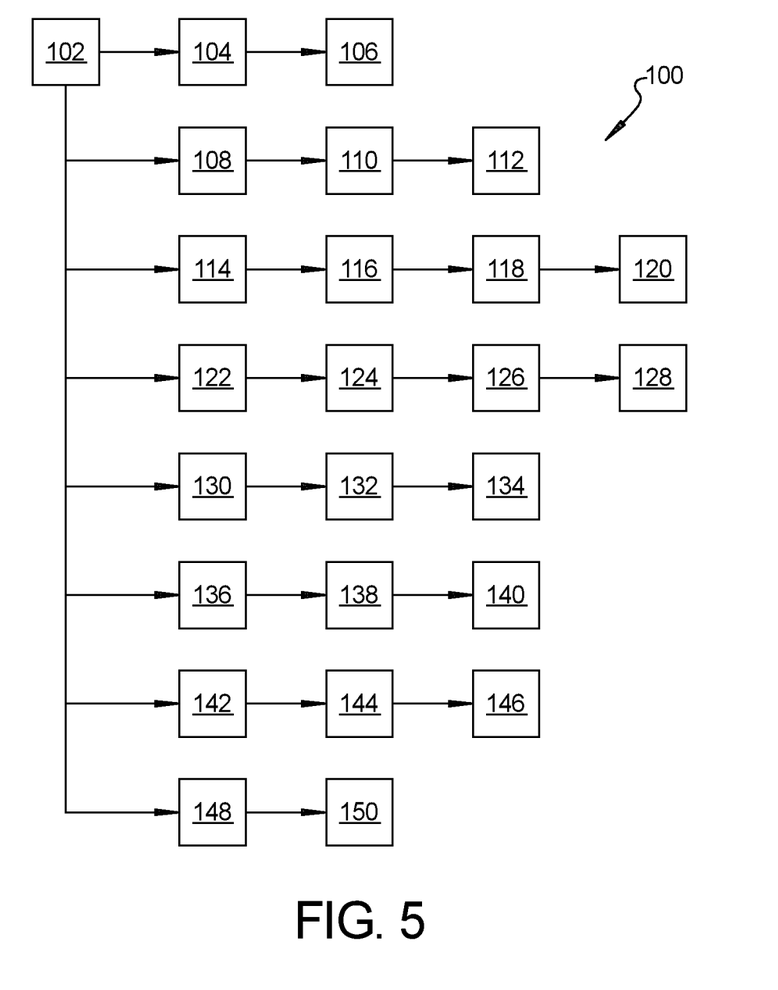
FIG. 5 is a flow chart illustrating a method according to an exemplary embodiment.

Referring to FIG. 5, a method 100 of determining when additional information is needed by a passenger with color deficient vision 12 within a vehicle 14 includes, beginning at block 102, collecting, with a plurality of perception sensors 16 within the vehicle 14, data related to a physical identity of a primary object 18 and communicating data related to the physical identity of the primary object 18, via a communication bus 20, to a data processor 22 within the vehicle 14. Moving to block 104, the method 100 further includes determining, with the data processor 22, that the physical identity of the primary object 18 may be unclear to a passenger with color deficient vision 12 based on the data related to the physical identity of the primary object 18, and, moving to block 106, determining, with the data processor 22, that assistance should be provided to the passenger with color deficient vision 12 to aid the passenger with color deficient vision 12 in identifying the primary object 18.

In an exemplary embodiment, the method 100 further includes, moving from block 102 to block 108, collecting, with the plurality of perception sensors 16 within the vehicle 14, data related to secondary objects 28 in proximity to the primary object 18 and communicating data related to the secondary objects 28, via the communication bus 20, to the data processor 22 within the vehicle 14, moving to block 110, determining, with the data processor 22, that the physical identity of the primary object 18 may be unclear to a passenger with color deficient vision 12 based on the location of the secondary objects 28 relative to the primary object 18, and, moving to block 112, determining, with the data processor 22, that assistance should be provided to the passenger with color deficient vision 12 to aid the passenger with color deficient vision 12 in identifying the primary object 18.

In another exemplary embodiment, the method 100 further includes, moving from block 102 to block 114, collecting, with an infotainment system 32 adapted to allow the passenger with color deficient vision 12 within the vehicle 14 to input feedback that a primary object 18 is difficult to identify, feedback from the passenger with color deficient vision 12 within the vehicle 14 that a primary object 18 is difficult to identify, moving to block 116, communicating the feedback from the passenger with color deficient vision 12 to the data processor 22 via the communication bus 20, moving to block 118, determining, with the data processor 22, that the physical identity of the primary object 18 may be unclear to the passenger with color deficient vision 12 based on the feedback from the passenger with color deficient vision 12 within the vehicle 14, and, moving to block 120, determining, with the data processor 22, that assistance should be provided to the passenger with color deficient vision 12 to aid the passenger with color deficient vision in identifying the primary object 18.

In another exemplary embodiment, the method 100 further includes, moving from block 102 to block 122, accessing, with the data processor 22, via a wireless communication network 34, a remotely located database 36 having historical data of prior feedback from other passengers with color deficient vision 40 in other vehicles 42 that the primary object 18 is difficult to identify, moving to block 124, collecting, with the data processor 22, via the wireless communication network 34, historical data, from the remotely located database 36, of prior feedback from other passengers with color deficient vision 40 in other vehicles 42 that the primary object 18 is difficult to identify, moving to block 126, determining, with the data processor 22, that the physical identity of the primary object 18 may be unclear to the passenger with color deficient vision 12 based on the historical data, and, moving to block 128, determining, with the data processor 22, that assistance should be provided to the passenger with color deficient vision 12 to aid the passenger with color deficient vision 12 in identifying the primary object 18.

In another exemplary embodiment, the method 100 further includes, moving from block 102 to block 130, accessing, with the data processor 22, historical data stored within the data processor 22 of prior feedback by the passenger with color deficient vision 12 within the vehicle 14 that the primary object 18 is difficult to identify, moving to block 132, determining, with the data processor 22, that the physical identity of the primary object 18 may be unclear to the passenger with color deficient vision 12 based on the prior feedback by the passenger with color deficient vision 12 that the primary object 18 is difficult to identify, and, moving to block 134, determining, with the data processor 22, that assistance should be provided to the passenger with color deficient vision 12 to aid the passenger with color deficient vision 12 in identifying the primary object 18.

In another exemplary embodiment, the method 100 further includes, moving from block 102 to block 136, accessing, with the data processor 22, historical data stored within the data processor 22 of prior feedback by the passenger with color deficient vision 12 within the vehicle 14 that the primary object 18 is not difficult to identify, moving to block 138, determining, with the data processor 22, that the physical identity of the primary object 18 is identifiable by the passenger with color deficient vision 12 based on the prior feedback by the passenger with color deficient vision 12 that the primary object 18 is not difficult to identify, and, moving to block 140, determining, with the data processor 22, that assistance should not be provided to the passenger with color deficient vision 12 to aid the passenger with color deficient vision 12 in identifying the primary object 18.

In another exemplary embodiment, the method 100 further includes, moving from block 102 to block 142, accessing, with the data processor 22, via the wireless communication network 34, a remotely located database 36 having historical data of prior feedback from other passengers 40 in other vehicles 42 of the physical identity of the primary object 18, moving to block 144, collecting, with the data processor 22, via the wireless communication network 34, historical data, from the remotely located database 36, of the prior feedback from other passengers 40 in other vehicles 42 of the physical identity of the primary object 18, and, moving to block 146, when the data processor 22 has determined that the physical identity of the primary object 18 may be unclear to the passenger with color deficient vision 12, determining, with the data processor 22, that assistance should be provided to the passenger with color deficient vision 12 based on the historical data of previous indications of the physical identity of the primary object 18 to aid the passenger with color deficient vision 12 in identifying the primary object 18.

In another exemplary embodiment, the method 100 further includes, moving from block 102 to block 148, accessing, with the data processor 22, historical data stored within the data processor 22 of prior feedback from the passenger with color deficient vision 12 within the vehicle 14 of the physical identity of the primary object 18, and, moving to block 150, when the data processor 22 has determined that the physical identity of the primary object 18 may be unclear to the passenger with color deficient vision 12, determining, with the data processor 22, that assistance should be provided to the passenger with color deficient vision 12 based on the historical data of the prior feedback from the passenger with color deficient vision 12 of the physical identity of the primary object 18.

A system 10 and method 100 of the present disclosure offers the advantage of determining when additional information is needed for a passenger with color deficient vision 12 to aid the passenger with color deficient vision 12 in identifying an object in proximity to a vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of determining when additional information is needed by a passenger with color deficient vision within a vehicle, comprising:
   collecting, with a plurality of perception sensors within the vehicle, data related to a physical identity of a primary object and communicating data related to the physical identity of the primary object, via a communication bus, to a data processor within the vehicle;
   collecting, with the plurality of perception sensors within the vehicle, data related to secondary objects in proximity to the primary object and communicating data related to the secondary objects, via the communication bus, to the data processor within the vehicle;
   determining, with the data processor, that the physical identity of the primary object may be unclear to a passenger with color deficient vision based on the data related to the physical identity of the primary object and based on the location of the secondary objects relative to the primary object; and
   determining, with the data processor, that assistance should be provided to the passenger with color deficient vision to aid the passenger with color deficient vision in identifying the primary object.

2. The method of claim 1, further including:
   collecting, with an infotainment system adapted to allow a passenger with color deficient vision within the vehicle to input feedback that a primary object is difficult to identify, feedback from the passenger with color deficient vision within the vehicle that a primary object is difficult to identify;
   communicating the feedback from the passenger with color deficient vision to the data processor via the communication bus;
   determining, with the data processor, that the physical identity of the primary object may be unclear to the passenger with color deficient vision based on the feedback from the passenger with color deficient vision within the vehicle; and
   determining, with the data processor, that assistance should be provided to the passenger with color deficient vision to aid the passenger with color deficient vision in identifying the primary object.

3. The method of claim 1, further including:
   accessing, with the data processor, via a wireless communication network, a remotely located database having historical data of prior feedback from other passengers with color deficient vision in other vehicles that the primary object is difficult to identify;
   collecting, with the data processor, via the wireless communication network, historical data, from the remotely located database, of prior feedback from other passengers with color deficient vision in other vehicles that the primary object is difficult to identify;
   determining, with the data processor, that the physical identity of the primary object may be unclear to the passenger with color deficient vision based on the historical data; and
   determining, with the data processor, that assistance should be provided to the passenger with color deficient vision to aid the passenger with color deficient vision in identifying the primary object.

4. The method of claim 1, further including:
accessing, with the data processor, historical data stored within the data processor of prior feedback by the passenger with color deficient vision within the vehicle that the primary object is difficult to identify;
determining, with the data processor, that the physical identity of the primary object may be unclear to the passenger with color deficient vision based on the prior feedback by the passenger with color deficient vision that the primary object is difficult to identify; and
determining, with the data processor, that assistance should be provided to the passenger with color deficient vision to aid the passenger with color deficient vision in identifying the primary object.

5. The method of claim 1, further including:
accessing, with the data processor, historical data stored within the data processor of prior feedback by the passenger with color deficient vision within the vehicle that the primary object is not difficult to identify;
determining, with the data processor, that the physical identity of the primary object is identifiable by the passenger with color deficient vision based on the prior feedback by the passenger with color deficient vision that the primary object is not difficult to identify; and
determining, with the data processor, that assistance should not be provided to the passenger with color deficient vision to aid the passenger with color deficient vision in identifying the primary object.

6. The method of claim 1, further including:
accessing, with the data processor, via a wireless communication network, a remotely located database having historical data of prior feedback from other passengers in other vehicles of the physical identity of the primary object;
collecting, with the data processor, via the wireless communication network, historical data, from the remotely located database, of the prior feedback from other passengers in other vehicles of the physical identity of the primary object; and
when the data processor has determined that the physical identity of the primary object may be unclear to the passenger with color deficient vision, determining, with the data processor, that assistance should be provided to the passenger with color deficient vision based on the historical data of previous indications of the physical identity of the primary object to aid the passenger with color deficient vision in identifying the primary object.

7. The method of claim 1, further including:
accessing, with the data processor, historical data stored within the data processor of prior feedback from the passenger with color deficient vision within the vehicle of the physical identity of the primary object; and
when the data processor has determined that the physical identity of the primary object may be unclear to the passenger with color deficient vision, determining, with the data processor, that assistance should be provided to the passenger with color deficient vision based on the historical data of the prior feedback from the passenger with color deficient vision of the physical identity of the primary object.

8. The method of claim 1, further including, determining that additional assistance is necessary:
communicating, with the data processor, with systems within the vehicle; and
providing, with the systems within the vehicle, additional information to the passenger with color deficient vision via at least one of audible messages, textual information displayed on an infotainment system and through a head-up-display system.

9. A system for determining when additional information is needed by a passenger with color deficient vision within a vehicle, comprising:
a plurality of perception sensors within the vehicle adapted to:
collect data related to a physical identity of a primary object and to communicate the data related to the physical identity of the primary object, via a communication bus, to a data processor within the vehicle; and
collect data related to secondary objects in proximity to the primary object and to communicate the data related to the secondary objects, via the communication bus, to the data processor within the vehicle;
the data processor adapted to:
determine that the physical identity of the primary object may be unclear to a passenger with color deficient vision based on the data related to the physical identity of the primary object and based on the data related to the secondary objects, and that assistance should be provided to the passenger with color deficient vision to aid the passenger with color deficient vision in identifying the primary object.

10. The system of claim 9, further including an infotainment system adapted to allow a passenger with color deficient vision within the vehicle to input feedback that a primary object is difficult to identify and to communicate the feedback from the passenger with color deficient vision that a primary object is difficult to identify to the data processor via the communication bus;
the data processor adapted to determine that the physical identity of the primary object may be unclear to the passenger with color deficient vision based on the feedback from the passenger with color deficient vision within the vehicle that the primary object is difficult to identify, and that assistance should be provided to the passenger with color deficient vision to aid the passenger with color deficient vision in identifying the primary object.

11. The system of claim 9, further including a wireless communication network adapted to allow communication between the data processor and a remotely located database, the remotely located database having historical data of prior feedback from other passengers with color deficient vision in other vehicles that the primary object is difficult to identify stored thereon;
the data processor adapted to collect the historical data of prior feedback from other passengers with color deficient vision in other vehicles that the primary object is difficult to identify from the remotely located database, determine that the physical identity of the primary object may be unclear to the passenger with color deficient vision based on the historical data of prior feedback from other passengers with color deficient vision in other vehicles that the primary object is difficult to identify, and that assistance should be provided to the passenger with color deficient vision to aid the passenger with color deficient vision in identifying the primary object.

12. The system of claim 9, wherein the data processor further includes historical data of prior feedback from the passenger with color deficient vision within the vehicle that the primary object is difficult to identify stored thereon;
the data processor adapted to determine that the physical identity of the primary object may be unclear to the passenger with color deficient vision based on the historical data of prior feedback from the passenger with color deficient vision that the primary object is difficult to identify, and that assistance should be provided to the passenger with color deficient vision to aid the passenger with color deficient vision in identifying the primary object.

13. The system of claim 9, wherein the data processor further includes historical data of prior feedback from the passenger with color deficient vision within the vehicle that the primary object is not difficult to identify stored thereon;

the data processor adapted to determine that the physical identity of the primary object is identifiable to the passenger with color deficient vision based on the historical data of prior feedback from the passenger with color deficient vision that the primary object is not difficult to identify, and that assistance should not be provided to the passenger with color deficient vision to aid the passenger with color deficient vision in identifying the primary object.

14. The system of claim 9, further including a wireless communication network adapted to allow communication between the data processor and a remotely located database, the remotely located database including historical data of prior feedback from other passengers in other vehicles of the physical identity of the primary object stored thereon;

the data processor adapted to collect the historical data of prior feedback from other passengers in other vehicles of the physical identity of the primary object from the remotely located database, and to determine that assistance should be provided to the passenger with color deficient vision based on the historical data of prior feedback from other passengers in other vehicles of the physical identity of the primary object when the data processor determines that the physical identity of the primary object may be unclear to the passenger with color deficient vision.

15. The system of claim 9, wherein the data processor further includes historical data of prior feedback from the passenger with color deficient vision within the vehicle of the physical identity of the primary object stored thereon;

the data processor adapted to determine that assistance should be provided to the passenger with color deficient vision based on the historical data of prior feedback from the passenger with color deficient vision within the vehicle of the physical identity of the primary object when the data processor determines that the physical identity of the primary object may be unclear to the passenger with color deficient vision.

16. The system of claim 9, wherein, when the system determines that additional assistance is necessary the data processor is further adapted to communicate with systems within the vehicle adapted to provide additional information to the passenger with color deficient vision via at least one of audible messages, textual information displayed on an infotainment system and through a head-up-display system.

* * * * *